United States Patent
Lee et al.

(10) Patent No.: US 12,287,784 B2
(45) Date of Patent: Apr. 29, 2025

(54) SELF-OPTIMIZING DATABASE OBJECTS USING VIRTUAL SEGMENTS

(71) Applicant: Oracle International Corporation, Redwood Shores, CA (US)

(72) Inventors: Teck Hua Lee, Newark, CA (US); Yu Chieh Fu, Redmond, WA (US); Sujatha Muthulingam, San Ramon, CA (US); Vicente Hernandez Jimenez, Zapopan (MX)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/138,242

(22) Filed: Apr. 24, 2023

(65) Prior Publication Data

US 2024/0354299 A1 Oct. 24, 2024

(51) Int. Cl.
| | |
|---|---|
| *G06F 16/30* | (2019.01) |
| *G06F 16/11* | (2019.01) |
| *G06F 16/21* | (2019.01) |
| *G06F 16/2453* | (2019.01) |
| *G06F 16/28* | (2019.01) |

(52) U.S. Cl.
CPC ........ *G06F 16/2453* (2019.01); *G06F 16/113* (2019.01); *G06F 16/214* (2019.01); *G06F 16/282* (2019.01)

(58) Field of Classification Search
CPC .. G06F 16/2453; G06F 16/282; G06F 16/214; G06F 16/113
See application file for complete search history.

(56) References Cited

U.S. PATENT DOCUMENTS

| | | | |
|---|---|---|---|
| 8,478,731 B1 * | 7/2013 | Throop | G06F 16/1744 707/693 |
| 2008/0162523 A1 * | 7/2008 | Kraus | G06F 16/2282 |
| 2013/0246372 A1 * | 9/2013 | Rao | G06F 16/1744 707/692 |

(Continued)

OTHER PUBLICATIONS

Al-Kateb et al., "Hybrid RowColumn Partitioning in Teradata", VLDB Endowment 21508097/16/09, vol. 9, No. 13, 2016, 12 pages.

(Continued)

*Primary Examiner* — Khanh B Pham
(74) *Attorney, Agent, or Firm* — Hickman Becker Bingham Ledesma LLP

(57) ABSTRACT

Techniques are provided for optimizing storage of database data records in segments using sub-segments. A segment may be comprised of a plurality of extents that contain data blocks and a plurality of references to sub-segments. Sub-segments are containers that contain other extents. A request to insert a set of records into a segment may be received by a database management system. Upon receiving the request, a particular sub-segment is selected to temporarily store the set of records. The set of records are inserted into data blocks belonging to an extent of the sub-segment. Access frequency for the set of records is monitored to determine whether the access frequency is less than a first threshold. When the access frequency of a subset of records is less than a first threshold, the subset of records is compressed and inserted into a particular extent of a particular segment.

18 Claims, 6 Drawing Sheets

(56) References Cited

U.S. PATENT DOCUMENTS

| | | | |
|---|---|---|---|
| 2013/0326252 A1* | 12/2013 | Ise | G06F 1/3225 |
| | | | 713/323 |
| 2014/0095449 A1* | 4/2014 | Marwah | G06F 16/217 |
| | | | 707/668 |
| 2017/0116233 A1* | 4/2017 | Groseclose | G06F 16/1744 |
| 2018/0046381 A1* | 2/2018 | Fagiano | G06F 3/0685 |
| 2018/0232181 A1* | 8/2018 | Zhou | G06F 3/0604 |
| 2021/0117132 A1* | 4/2021 | Vankamamidi | G06F 3/0688 |
| 2022/0043594 A1* | 2/2022 | Idicula | G06F 3/0683 |

OTHER PUBLICATIONS

"TimescaleDB 2.3: Improving Columnar Compression for Time-Series on PostgreSQL" available: https://www.timescale.com/blog/timescaledb-2-3-improving-columnar-compression-for-time-series-on-postgresql/, retrieved Feb. 22, 2024.

* cited by examiner

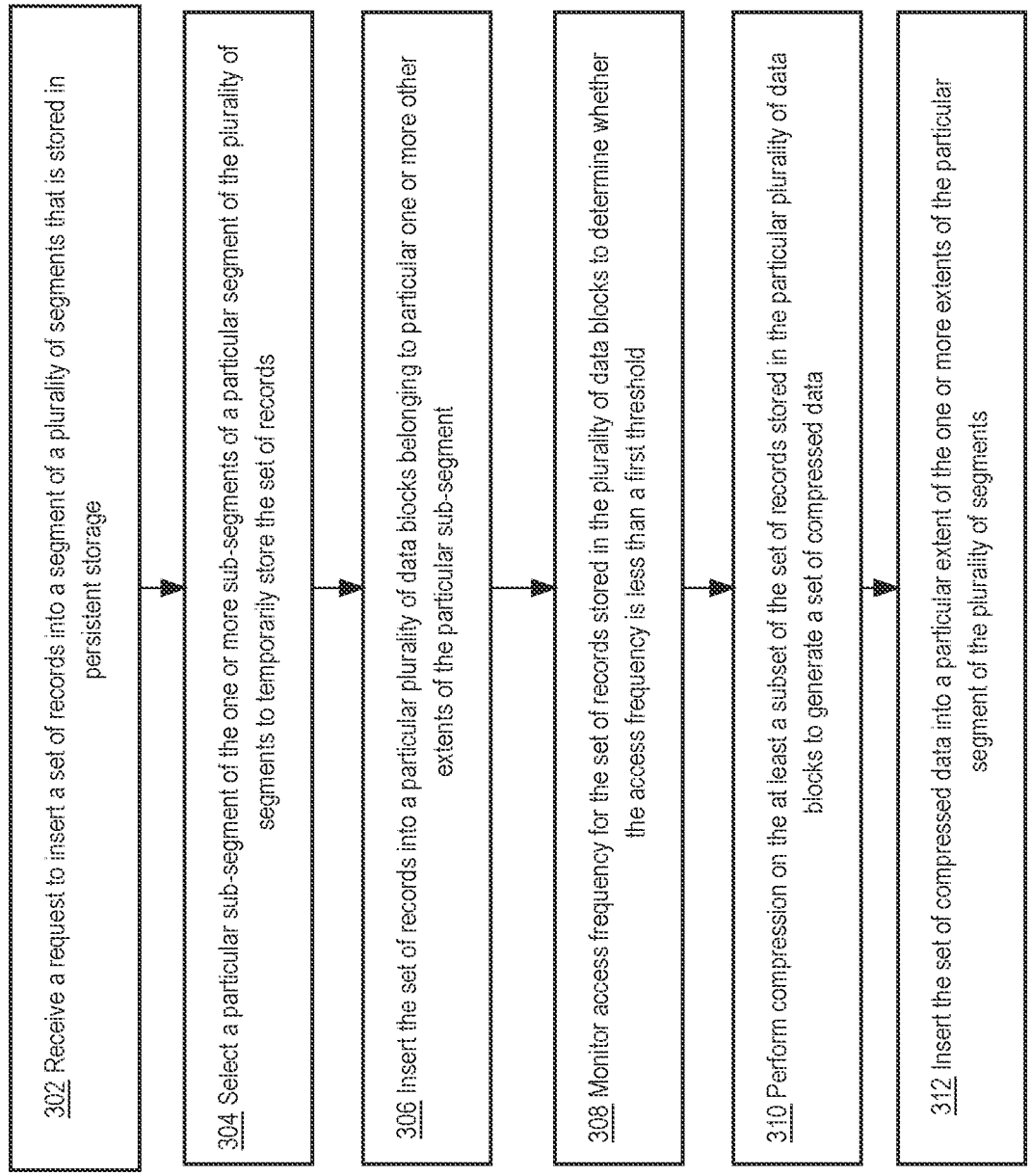

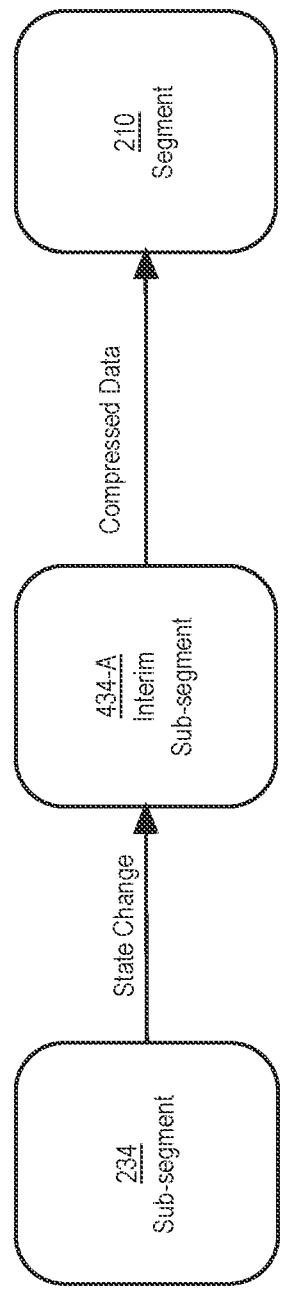

SELF-OPTIMIZING DATABASE OBJECTS USING VIRTUAL SEGMENTS

FIELD OF THE INVENTION

The present invention relates to the field of electronic database management, in particular to using virtual segments to optimize storage of database objects within segments.

BACKGROUND

In database systems, a data block corresponds to a specific number of bytes of physical space on disk. The size of a data block represents the smallest unit of storage that a database may allocate for storing a database object. On disk, data blocks are organized in an extent. An extent is defined as a specific number of contiguous data blocks allocated for storing a specific type of information. A segment contains a set of extents that has been allocated for a specific type of data structure. For example, data in a database table may be stored in a segment that includes a set of extents, where each extent in the segment is made up of a set of contiguous data blocks.

As records are stored in data blocks of an extent of a segment, the size of the segment grows. The records, once stored, may be accessed and modified by database operations. When records are deleted from a segment, the records are removed from the data blocks of the extent. However, such free space cannot be reused by bulk load operations or by other segments. This may lead to extents in the segment that are fragmented. Fragmentation may result in poor storage efficiency as well as diminished database performance, especially when performing scans of records in extents in segments.

Another limitation to conventional segments is that a single segment may only implement a single type of compression technique. For example, a segment for a database table that contains records that are accessed infrequently may be highly compressed in order to save storage space. This technique may be useful when the records in the segment are accessed at relatively the same frequency. However, if a segment contains a first subset of records that are accessed infrequently and a second subset of records that are accessed frequently, then selecting a single compression technique for the entire segment will result in either inefficient storage of the first subset of records or inefficient performance for the second subset of records. Therefore a mechanism for optimizing storage and optimizing performance for records in a segment is desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is a flow diagram that depicts a process for receiving a request to insert records into persistent storage, optimizing compression for the records using sub-segments, and storing the records in persistent storage, according to an embodiment.

FIG. 4A depicts an example of a workload flow for storing a set of records in a segment using a sub-segment, according to an embodiment.

DETAILED DESCRIPTION

Figure 1:
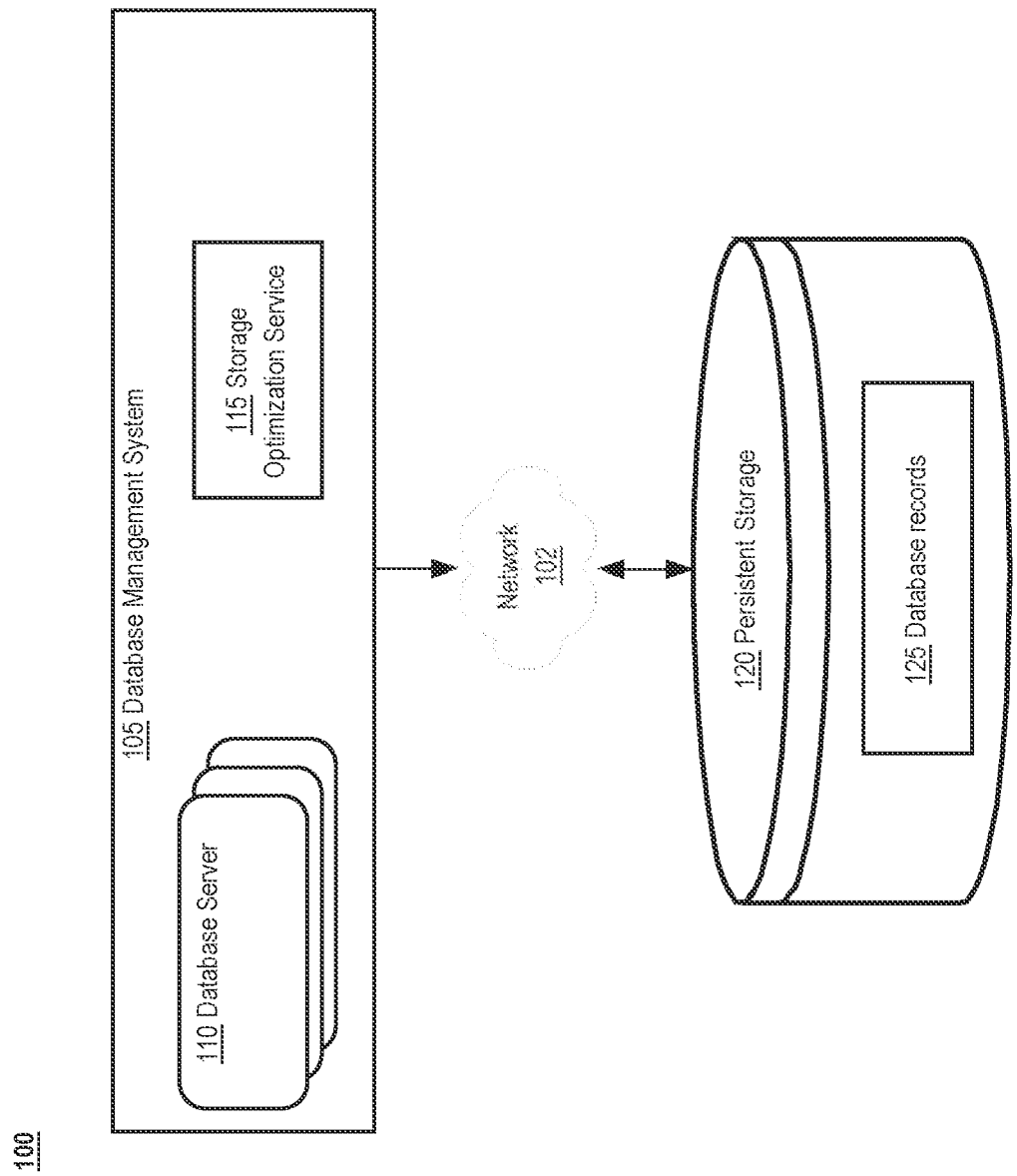
FIG. 1 is a system diagram that illustrates a database management system implemented to store records in persistent storage, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for optimizing storage of database data records in segments using sub-segments. Storage for a database management system may include a plurality of segments. Each segment contains a plurality of extents containing a plurality of data blocks and a plurality of references to one or more virtual segments associated with the segment. Virtual segments, herein referred to as sub-segments, are containers implemented to contain one or more extents. Sub-segments may be associated with a corresponding segment by way of an address pointer. For instance, a particular segment may contain a reference to metadata containing references to one or more sub-segments. Sub-segments allow for dynamic partitioning of records without an explicit partitioning column. For instance, subsets of records may be grouped together into specific partitions based on their corresponding access frequencies, where subsets records with different access frequency levels are stored within different sub-segments. Each of the different sub-segments may implement their own storage optimization technique that optimizes storage based on how frequently records are accessed.

In an embodiment, the database management system may receive a request to insert a set of records into a segment of the plurality of segments that make up the persistent storage. Upon receiving the request, the database management system may select a particular sub-segment associated with a particular segment to temporarily store the set of records. The database management system may issue one or more commands to insert the set of records in a particular plurality of data blocks belonging to particular extents of the particular sub-segment selected. After the set of records has been inserted in the particular sub-segment, a storage optimization service monitors how frequently the set of records are accessed, including how frequently the set of records are modified.

In an embodiment, the storage optimization service is implemented to determine how to optimize storage of records based on how the records are accessed. The storage optimization service monitors the set of records to determine whether access frequency is less than a first threshold, where the first threshold is used to determine when data blocks containing records should be optimized for storage. For instance, if access frequency drops below the first threshold, the storage optimization service may implement certain optimizations, such as high compression techniques, in order to preserve storage space while maintaining query performance. Optimization based on access frequency may be suitable for mostly read-only workloads. However, for mixed workloads, where updates occur more frequently, the storage optimization service may also implement more sophisticated workload analyses, such as analyzing historical access patterns as well as access frequencies to determine how to best optimize storage. Upon determining that the access frequency for a subset of the set of records stored in the particular plurality of data blocks, belonging to the particular sub-segment, is less than the first threshold, the storage optimization service performs compression on the subset of records. The subset of records is then inserted in an extent belonging to the particular segment.

In an embodiment, the particular sub-segment may be deleted if the set of records have been inserted into the particular segment or have been inserted into another sub-segment and the particular sub-segment is empty. By deleting empty sub-segments the database management system may be able to efficiently manage storage space. In embodiments, sub-segments may be dynamically reorganized in order to optimize storage space. For instance, records from multiple sub-segments may be consolidated into an existing or new sub-segment in order to remove older sub-segments that may contain fragmented records.

Additionally, sets of records in different sub-segments may be compressed using different compression techniques, such that sets of records in each sub-segment may be optimized for both storage and performance because compression of a set of records for a sub-segment is independent of other sets of records in other sub-segments. Thus, sub-segments provide a finer level of granularity for compressing records in segments by using different compression techniques for records in different sub-segments within each segment. By utilizing sub-segments to organize sets of records, database systems are able to increase compression optimization of data storage.

Structural Overview

FIG. 1 is a system diagram that illustrates a database management system implemented to store records in persistent storage, according to an embodiment. System 100 includes database management system (DBMS) 105, network 102, and persistent storage 120. DBMS 105 is implemented to manage one or more databases. DBMS 105 comprises one or more database servers 110 and a storage optimization service 115. Database server 110 may host one or more databases. A database may comprise database data and a data dictionary that are stored on a persistent memory mechanism, such as persistent storage 120 or any other hard disks. Database data may be stored in one or more collections of records. The data within each record is organized into one or more attributes. In relational DBMSs, the collections are referred to as tables (or data frames), the records are referred to as records, and the attributes are referred to as attributes. Users interact with database server 110 by submitting commands to database server 110 to perform operations on data stored in the database. Additional details for DBMS 105 and database server 110 are described in the DBMS OVERVIEW section herein, although an embodiment of the present invention is not so limited. Network 102 may be any type of network that provides communications, exchanges information, and/or facilitates the exchange of data between components of the DBMS 105 and persistent storage 120. For instance, network 102 may represent one or more local area networks (LANs), wide area networks (WANs), metropolitan area networks (WANs), or any other network implemented to facilitate data exchange between the components of system 100.

Storage Optimization Service

In an embodiment, the storage optimization service 115 is implemented to monitor data blocks containing records located in sub-segments and segments to determine whether to migrate the records between sub-segments and segments based on various criteria. Monitoring criteria may include, but is not limited to, monitoring access frequency of records and monitoring the size of sub-segments. For example, the storage optimization service 115 may use a heatmap to track row-level statistics to determine when certain records stored in a sub-segment or segment become "hot" or "cold". The term "heatmap" in this application refers to statistics reflecting activity regarding various elements in a database: elements with recent accesses are "hot" whereas elements without recent accesses are "cold". Upon identifying records that are cold, the storage optimization service 115 may implement one or more compression techniques to compress records prior to storing the records in a segment.

In an embodiment, the storage optimization service 115 may define one or more heatmap-based thresholds for identifying "hot" rows and "cold" rows. For example, the storage optimization service 115 may use a "cold threshold" to identify a subset of records in a sub-segment that are accessed at a frequency that is below the defined cold threshold. Subset of records that are below the cold threshold may be compressed and moved to a segment. Additionally, the storage optimization service 115 may use a "hot threshold" to identify a subset of records in the sub-segment that are accessed at a frequency that is above the defined hot threshold. This hot subset of records may stay in the sub-segment until the hot subset of records becomes "cold" or the hot subset of records may be moved to another sub-segment that contains only hot records.

The storage optimization service 115 may define additional heatmap based thresholds to further categorize records such that certain subsets of records may be compressed using different compression techniques. For example, a first subset of records identified that are accessed at the lowest frequency may be compressed using Hybrid Columnar Compression (HCC) techniques such as HCC Archive compression, which provides a high level of compression. A second subset of records that may be identified as being accessed at a second lowest frequency may be compressed using HCC Query compression, which provides high compression but faster access than HCC Archive. A third subset of records that may be identified as being accessed at a relatively frequent rate and may be compressed using Online Transaction Processing (OLTP) compression techniques. A fourth subset of records that may be identified as being accessed at a very high rate and as a result may be left in an uncompressed state. The storage optimization service 115 may implement any number of access frequency thresholds and implement any number of compression techniques to compress records prior to migrating the records to a segment. Additionally, the storage optimization service 115 may implement different types of storage properties other than compression techniques. For example, the storage optimization service 115 may format a sub-segment for storing records in an in-memory database format, where in-memory compression levels are tailored to the access frequencies of the stored records. In another example, the storage optimization service 115 may optimize block storage parameters used to specify the amount of free space in data blocks for future updates. This may be beneficial for hot records that are updated often.

Prior to optimizing any records stored in a sub-segment, the storage optimization service 115 changes the state of the sub-segment from a "staging" state to an "interim" state. The staging state for a sub-segment is a state in which the sub-segment may accept requests to load records in the sub-segment. Each sub-segment is associated with a transaction ID such that each sub-segment only receives records that are associated with the same transaction ID. The interim state is a state in which the sub-segment determines whether records should be optimized for storage in a segment and/or whether records should be moved to another sub-segment. When a sub-segment is in the interim stage, the sub-segment may not receive any additional records.

In an embodiment, the storage optimization service 115 may monitor size of sub-segments in persistent storage 120 to determine whether a sub-segment becomes too large. When sub-segments become a certain size query performance may degrade. For this reason, the storage optimization service 115 may implement one or more sized-based thresholds for monitoring sizes of sub-segments. When a sub-segment reaches a certain size, the storage optimization service 115 may change the state of the sub-segment such that the sub-segment does not receive any additional rows. The storage optimization service 115 may then migrate subsets of records to a segment if access frequencies for the subsets of records are below certain predefined thresholds. Moving records from a sub-segment to a segment means that the records are moved to a portion of the segment that is not a sub-segment. For example, from sub-segment 234 to extent 214. Additionally, the storage optimization service 115 may migrate all records from a sub-segment if the sub-segment has become too large and/or fragmented.

In an embodiment, storage optimization service 115 may keep the subset of records in a sub-segment without eventually moving the subset of records to the segment. For example, if the subset of records represents hot records that are updated frequently, then the storage optimization service 115 may keep the subset of records in a specific sub-segment configured for extremely hot data. The specific sub-segment may store the hot records in uncompressed form for optimal query performance.

Database Records

Referring to FIG. 1, persistent storage 120 generally represents any number of persistent storage devices, such as magnetic disks, FLASH memory, and/or solid-state drives. FIG. 1 depicts persistent storage 120 as being external from database server 110, however, in other embodiments persistent storage 120 may refer to local storage located on database server 110. Persistent storage 120 contains database records 125. Database records 125 represent records stored in persistent storage 120 from database instances running on database server 110. Database records 125 may be stored within a plurality of segments and sub-segments.

Figure 2:
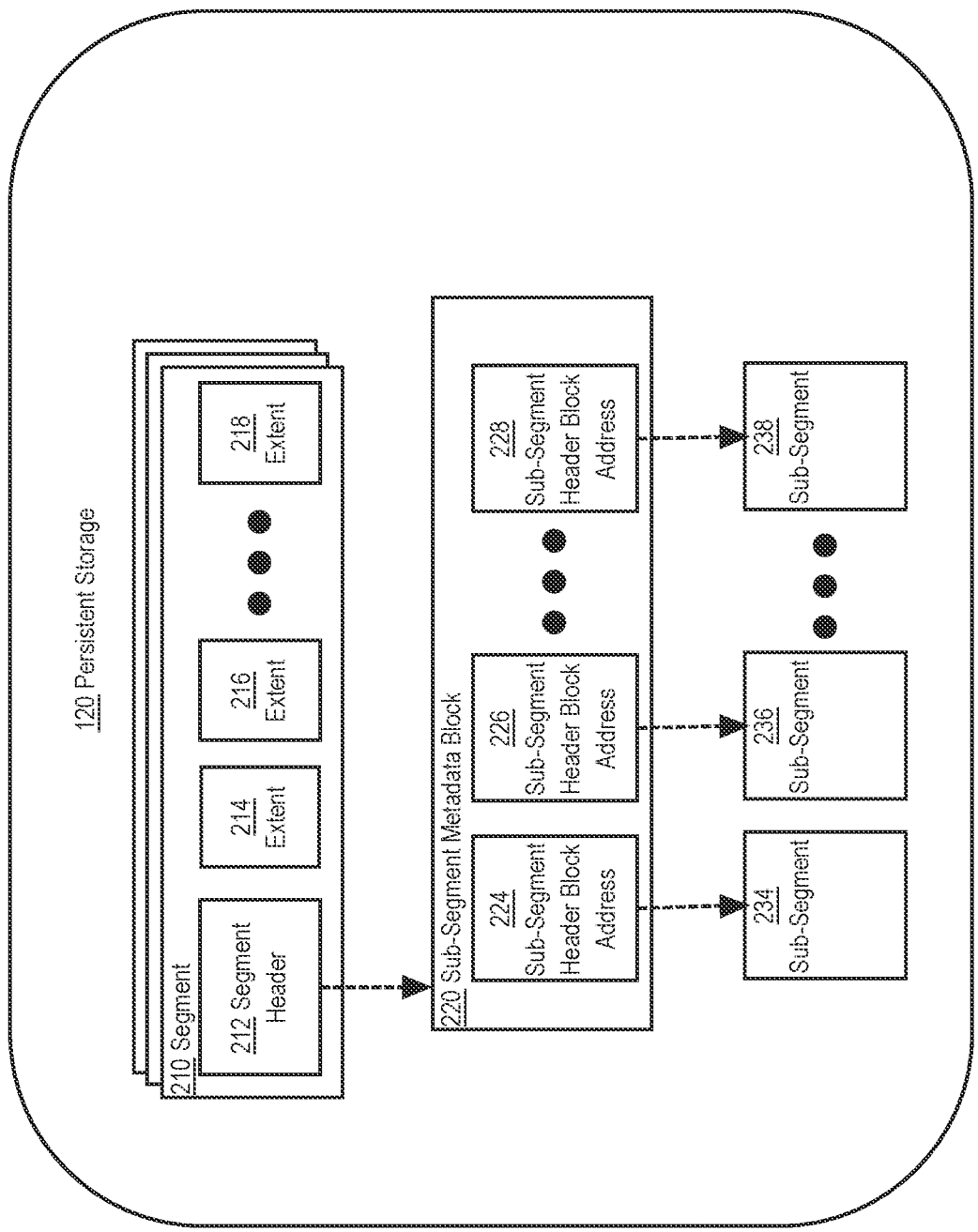
FIG. 2 is a block diagram of database records stored in persistent storage, illustrating relationships between segments and sub-segments, according to an embodiment.

FIG. 2 is a block diagram of persistent storage, illustrating relationships between segments and sub-segments, according to an embodiment. Segment 210 represents one or more segments in persistent storage 120 designated to store database records 125. Segment 210 contains a segment header 212 and extents 214, 216, and 218. Segment 210 may contain more or less extents than illustrated in FIG. 2. The segment header 212 is a header block that contains control information for free data blocks, extents, high water marks, and a reference to a sub-segment metadata block 220. Extents 214, 216, and 218 each represent contiguous sets of data blocks. A high water mark defines the data footprint of a segment. The location referenced by the high water mark refers to a boundary between used and unused space within a segment. Data blocks below the high water mark are data blocks that have been used at least once, while data blocks above the high water mark are data blocks that have yet to be used and do not contain data. The high water mark may be used during a table scan operation to identify which data blocks contain data that should be scanned and which data blocks do not contain data and should not be scanned.

In an embodiment, the sub-segment metadata block 220 is an object implemented to store an array of sub-segment header block addresses. Referring to FIG. 2, the sub-segment metadata block 220 contains sub-segment header block addresses 224, 226, and 228. Each of the sub-segment header block addresses 224, 226, and 228 refer to sub-segments 234, 236, and 238. As described, sub-segments are containers implemented to contain one or more extents. Due to the association between segments, sub-segment metadata blocks, and sub-segments, the sub-segments are hidden from end users and other layers of the database, such as a data dictionary, and query optimizers, and so on. Each sub-segment is independent of one another and their corresponding segment. As a result, sub-segments may be dynamically created and deleted and may implement their own compression algorithm on sets of contained records, independent of other sub-segments.

Sub-segments are implemented to accept various types of record inserts, including direct path loads. A direct path load is a technique for efficiently loading data into database files without using conventional SQL insert statements. The direct path load formats data blocks and directly writes the data blocks to database files. The direct path load uses the segment's high water mark to locate the unused data blocks, above the high water mark, and efficiently load the records into the unused data blocks. However, segments can only allow one direct path load at a time due to the fact there is only one high water mark per segment. Additionally, when executing a direct path load operation on a segment, the segment may be locked from certain queries and data manipulation language (DML) operations.

In an embodiment, each sub-segment has its own high water mark. Sub-segments are visible to a single transaction until that transaction is committed, then the sub-segment becomes visible to other transactions and processes. As a result, each sub-segment may accept its own direct path load, thereby allowing concurrent direct path loads to occur on multiple sub-segments that are associated with a single segment. For example referring to FIG. 2, segment 210 may allow multiple concurrent direct path loads where a first direct path load occurs on sub-segment 234, a second direct path load occurs on sub-segment 236, and a third direct path load occurs on sub-segment 238. While the direct path loads on sub-segments 234, 236, and 238 are in progress, the segment 210 may be able to accept a DML operation. Any table scans associated with the DML operation on segment 210 of a transaction that is not the direct path load transaction inserting records into sub-segments 234, 236, and 238, will simply skip scanning records in sub-segments 234, 236, and 238 because the direct path load transaction has not yet been committed.

Process Overview

Records to be stored in persistent storage 120 may be optimized for space reduction and increased query performance by the storage optimization service 115. FIG. 3 is a flow diagram that depicts a process 300 for receiving a request to insert records into persistent storage, optimizing compression for the records using sub-segments, and storing the records in persistent storage, according to an embodiment. The steps of the process as shown in FIG. 3 may be implemented using processor-executable instructions that are stored in computer memory. For the purposes of providing a clear example, the steps of FIG. 3 are described as being performed by processes executing in DBMS 105. For the purposes of clarity, the process described may be performed with more or fewer steps than described in FIG. 3.

At step 302, process 300 receives a request to insert a set of records into a segment of a plurality of segments that is stored in persistent storage. In an embodiment, DBMS 105 receives a request to insert a set of records into a segment in persistent storage 120. The request may be associated with a specific request from a user to insert new records into a particular table. For example, a user may generate a new request to insert sales records for last month into a SALES table. Alternatively, the request may have originated from an automated process implemented to move records from volatile memory to persistent storage 120.

At step 304, process 300 selects a particular sub-segment of the one or more sub-segments of a particular segment of the plurality of segments to temporarily store the set of records. In an embodiment, the DBMS 105 may identify the particular segment, segment 210, in persistent storage 120. Using the current example, segment 210 may be a segment that is associated with the SALES table and extents 214-218 may contain records that are part of the SALES table. If however, the SALES table is a newly created table, then DBMS 105 may create a new segment, segment 210, and designate segment 210 for storing records for the SALES table.

In an embodiment, the storage optimization service 115 may select a particular sub-segment to temporarily store the set of records. If the insert request is part of a new transaction, then the storage optimization service 115 may generate a new sub-segment, sub-segment 234, for inserting the set of records. Sub-segments are associated with a single transaction, therefore the newly created sub-segment 234 would be associated with the transaction ID for the request to insert the set of records. Upon generating sub-segment 234, the storage optimization service 115 associates sub-segment 234 with segment 210 by inserting, into sub-segment metadata block 220, a reference to the header block address for sub-segment 234, where segment header 212, of segment 210, contains a reference to the sub-segment metadata block 220. If segment header 212 does not already contain a reference to the sub-segment metadata block 220, then the storage optimization service 115 inserts the reference to the sub-segment metadata block 220 into the segment header 212 to create the association between segment 210 and sub-segment 234.

In another embodiment, if the insert request is part of an existing transaction, meaning the transaction ID associated with the insert request is part of an existing direct path load insert transaction with the same transaction ID, then the storage optimization service 115 selects the sub-segment, such as sub-segment 236, that is already associated with the existing transaction ID. In yet another embodiment, if the insert request is part of an existing transaction and the sub-segment associated with the existing transaction has a sub-segment size exceeding a predefined sub-segment size threshold, then the storage optimization service 115 may generate a new sub-segment, sub-segment 234, for inserting the set of records. For example, if sub-segment 236 is associated with the existing transaction ID and the size sub-segment 236 exceeds the defined sub-segment size threshold of 10 GB, then the storage optimization service 115 may generate a new sub-segment, sub-segment 234 and select sub-segment 234 for insertion of the set of records.

At step 306, process 300 inserts the set of records into a particular plurality of data blocks belonging to particular one or more other extents of the particular sub-segment. In an embodiment, the storage optimization service 115 inserts the set of records into a plurality of data blocks belonging to an extent that belongs to sub-segment 234. FIG. 4A depicts an example of a workload flow for storing a set of records in a segment using a sub-segment, according to an embodiment. Sub-segment 234 represents the target sub-segment where the storage optimization service 115 inserts the set of records. For example, sub-segment 234 contains a plurality of extents that each contain a plurality of data blocks. The storage optimization service 115 inserts the set of records for the SALES table, in uncompressed form, into a plurality of data blocks that are part of extents that belong to sub-segment 234. In an embodiment, when sub-segment 234 is accepting inserts of records, sub-segment 234 is in the "staging" state. The staging state is a state of the sub-segment where records are inserted into the sub-segment in uncompressed form.

At step 308, process 300 monitors access frequency for the set of records stored in the plurality of data blocks to determine whether the access frequency is less than a first threshold. In an embodiment, the storage optimization service 115 uses a heatmap to track row-level statistics of records stored in sub-segment 234 to determine whether the access frequency of records is less than a first threshold. A first threshold may represent an access frequency level that delineates between "very cold" records and "cold" records. Records that are identified as being "very cold" may be eventually compressed using higher compression techniques such as HCC Archive compression, whereas records identified as being "cold" may be compressed using high compression techniques such as HCC Query compression. In an embodiment, the storage optimization service 115 may implement several different access frequency thresholds to determine whether subsets of records should be compressed using appropriate compression levels based on the thresholds implemented.

During monitoring, the storage optimization service 115 may determine that the access frequency for at least a subset of the set of records stored in the particular plurality of data blocks, belonging to sub-segment 234, is below the first threshold. In an embodiment, the storage optimization service 115 may then change the state of sub-segment 115 from "staging" to "interim". The interim stage for sub-segment 234 means that sub-segment 234 will not accept any additional inserts of records, and that one or more existing records stored in sub-segment 234 may be either compressed and moved to segment 210, or moved to another sub-segment. Referring to FIG. 4A, the storage optimization service 115 changes the state of sub-segment 234 from "staging" to "interim". The interim stage is represented by interim sub-segment 434. Scenarios in which the storage optimization service 115 changes the state of a sub-segment from "staging" to "interim" includes: when access frequency for at least a subset of records in the sub-segment is below a threshold, size of the sub-segment exceeds a predefined sub-segment size threshold, or the storage optimization service 115 receives a command indicating that the transaction has completed.

Referring back to FIG. 3, at step 310, process 300 performs compression on the at least a subset of the set of records stored in the particular plurality of data blocks to generate a set of compressed data. In an embodiment, the storage optimization service 115, upon determining that the access frequency for at least a subset of the set of records in interim sub-segment 434 is below the first threshold (step 308), the storage optimization service 115 performs compression on the at least a subset of the set of records to generate a set of compressed data. For example, the storage optimization service 115 may have determined that a first subset of the records are below the access frequency defined by the first threshold, where the first threshold is a threshold to identify the "very cold" records. In response to this determination, the storage optimization service 115 may perform compression on the first subset of the records, where the compression technique used compresses the first subset of records at a very high compression rate, such as using HCC Archive compression, to generate the set of compressed data.

In an embodiment, the storage optimization service 115 may be monitoring the access frequency for the remaining set of records stored in the plurality of data blocks to determine whether the access frequency is above the first threshold but below a second threshold. The second threshold may be a threshold delineating between "cold" records and "warm" records, where records that are below the second threshold but are above the first threshold are considered "cold". If the storage optimization service 115 identifies a second subset of records that are below the second threshold but are above the first threshold, then the storage optimization service 115 may compress the second subset of records using a different compression technique, such as HCC Query.

At step 312, process 300 inserts the set of compressed data into a particular extent of the one or more extents of the particular segment of the plurality of segments. In an embodiment, the storage optimization service 115, upon compressing the at least a subset of the set of records to generate the set of compressed data, the storage optimization service 115 inserts the compressed data into one or more of the extents 214, 216, and 218, which belong to segment 210. The at least a subset of the set of data records that were compressed and stored in extents belonging to segment 210 are then deleted from sub-segment 234.

In an embodiment, if all of the records from sub-segment 234 have been either moved or deleted, then the storage optimization service 115 may delete the sub-segment 234 in order to reclaim the storage space. Upon deletion of sub-segment 234, the storage optimization service 115 may remove the reference to the sub-segment 234, the sub-segment header block address 224, from the sub-segment metadata block 220.

Additional Record Optimizations

Figure 4B:
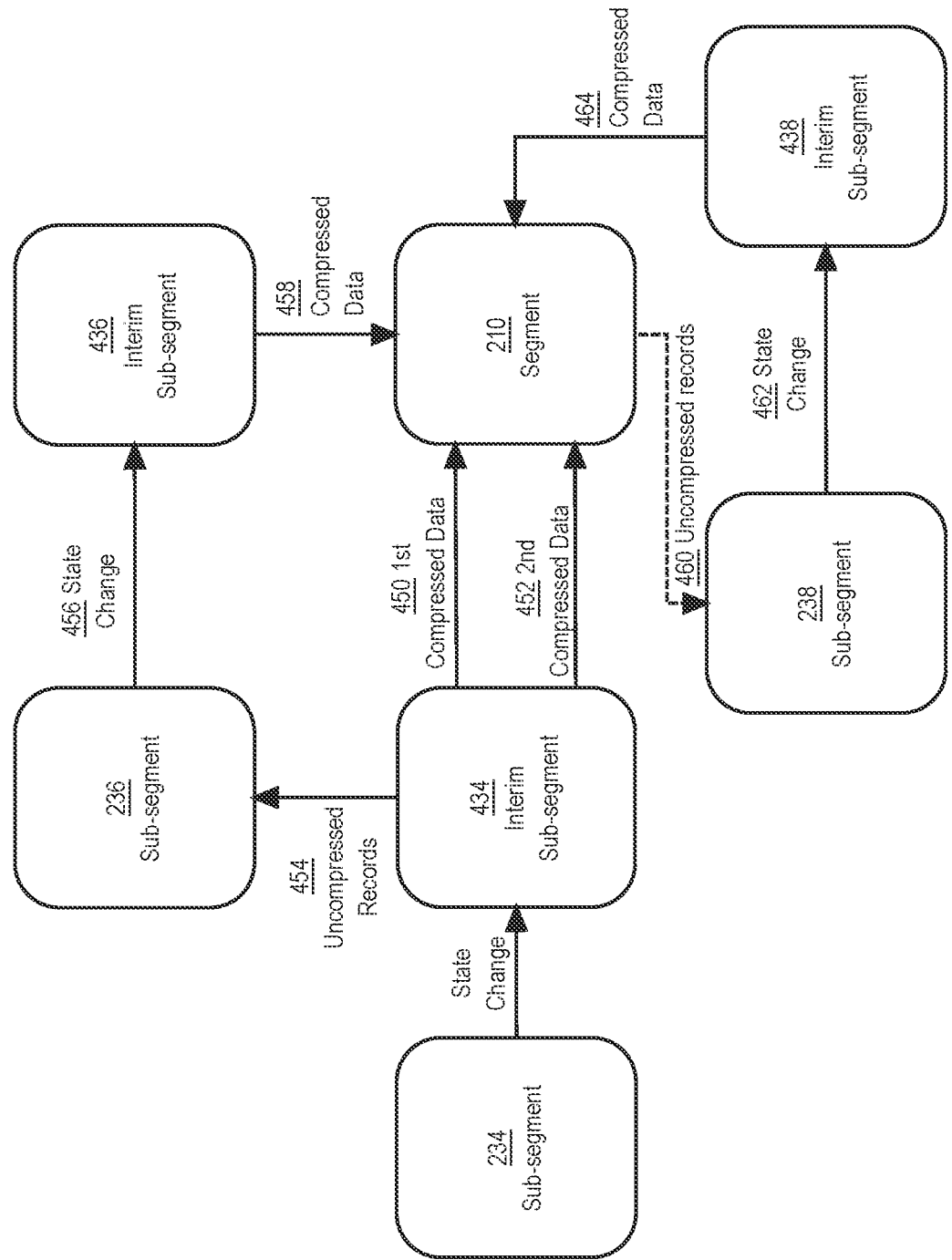
FIG. 4B depicts an example of a workload flow for storing a set of records in a segment using multiple sub-segments, according to an embodiment.

In an embodiment, the storage optimization service 115 may utilize multiple sub-segments to reorganize and compress records, based on their respective access frequencies. FIG. 4B depicts an example of a workload flow for storing a set of records in a segment using multiple sub-segments, according to an embodiment. In FIG. 4B, sub-segment 234 represents a sub-segment that has been loaded with a set of records. Interim sub-segment 434 represents the sub-segment after the storage optimization service 115 has changed the state of sub-segment 234 from "staging" to "interim". As discussed, the storage optimization service 115 may change the state of a sub-segment from "staging" to "interim" if the storage optimization service 115 determines that either: (1) the access frequency of at least a subset of records in sub-segment 234 is below is the first threshold, (2) the size of sub-segment 234 exceed the size threshold, or (3) the storage optimization service 115 receives a command indicating that the transaction associated with sub-segment 234 has completed.

In an embodiment, the storage optimization service 115 monitors access frequency of the set of records in interim sub-segment 434. As described previously, the storage optimization service 115 may implement multiple different access thresholds to determine different sets of records that may be optimized using different levels of compression. For example, if the storage optimization service 115 determines that the access frequency for a first subset of the set of records in interim sub-segment 434 is below the first threshold, then the storage optimization service 115 may compress the first set of records using the highest level of compression, such as HCC Archive, to generate first compressed data 450. The first compressed data 450 is then inserted into segment 210. If the storage optimization service 115 determines that the access frequency for a second subset of the set of records in interim sub-segment 434 is below a second threshold but above the first threshold, then the storage optimization service 115 may compress the second set of records using the second highest level of compression, such as HCC Query, to generate second compressed data 452. The second compressed data 452 is then inserted into segment 210.

In an embodiment, the storage optimization service 115 may determine that the access frequency for a third subset of records in interim sub-segment 434 is above a third threshold, where exceeding the third threshold indicates that the third subset of records is "hot". The storage optimization service may transfer the third subset of records to another sub-segment that contains other hot records. For example, the storage optimization service 115 may move the third subset of records from interim sub-segment 434 to sub-segment 236. The transfer of records between sub-segments is performed without compressing the records. Referring to FIG. 4B, uncompressed records 454 represents the third subset of records that are transferred from interim sub-segment 434 to sub-segment 236.

The storage optimization service 115 may monitor the hot records in sub-segment 236 to determine when the records are below an access frequency threshold or when the size of sub-segment 236 exceeds the predefined sub-segment size threshold. Referring to FIG. 4B, when the storage optimization service 115 determines that either the records are below an access frequency threshold or when the size of sub-segment 236 exceeds the predefined sub-segment size threshold, the storage optimization service 115 performs state change 456 which changes the state of sub-segment 236 to interim sub-segment 436. Once in the interim state, interim sub-segment 436 may be monitored to determine when records are below a frequency threshold in order to compress and transfer the records to segment 210. Compressed data 458 represents when the storage optimization service 115 compresses records and inserts the compressed data 458 into segment 210.

In an embodiment, if the records in interim segment 436 remain "very hot", meaning that the records are accessed at such a frequency that the none of the access frequency thresholds are crossed, then the storage optimization service 115 may insert the records, in an uncompressed state, into segment 210. An example of this situation may be that the records in interim sub-segment 436 are records that are accessed and/or modified at such a high frequency that any compression of the records would degrade performance.

Therefore the storage optimization service 115 inserts the records into segment 210 as no compression may be optimal for storing such records.

The storage optimization service 115 may also monitor access frequencies of compressed records stored in segment 210. In an embodiment, if the access frequency of a set of compressed records exceeds a particular threshold for identifying "hot" data, then the storage optimization service 115 may move the set of compressed records to a sub-segment. Specifically, the storage optimization service 115 may decompress the set of compressed records to generate uncompressed records and insert the uncompressed records into a sub-segment. Referring to FIG. 4B, uncompressed records 460 represents the storage optimization service 115 decompressing the set of compressed records and inserting the uncompressed records 460 into sub-segment 238. Once the uncompressed records 460 are in sub-segment 238, the storage optimization service 115 may monitor access frequencies of records in sub-segment 238. The storage optimization service 115 will change the state of sub-segment 238 from "staging" to "interim" (state change 462) once the access frequencies of records are below an access frequency threshold or the size of sub-segment 238 exceeds the pre-defined sub-segment size threshold, represented by interim sub-segment 438. Compressed data 464 represents when the storage optimization service 115 compresses records in interim sub-segment 438 and inserts the compressed data 464 into segment 210.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically-marked data objects; however, the hierarchically-marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e. .java file) and the compiled version of the class (i.e. .class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
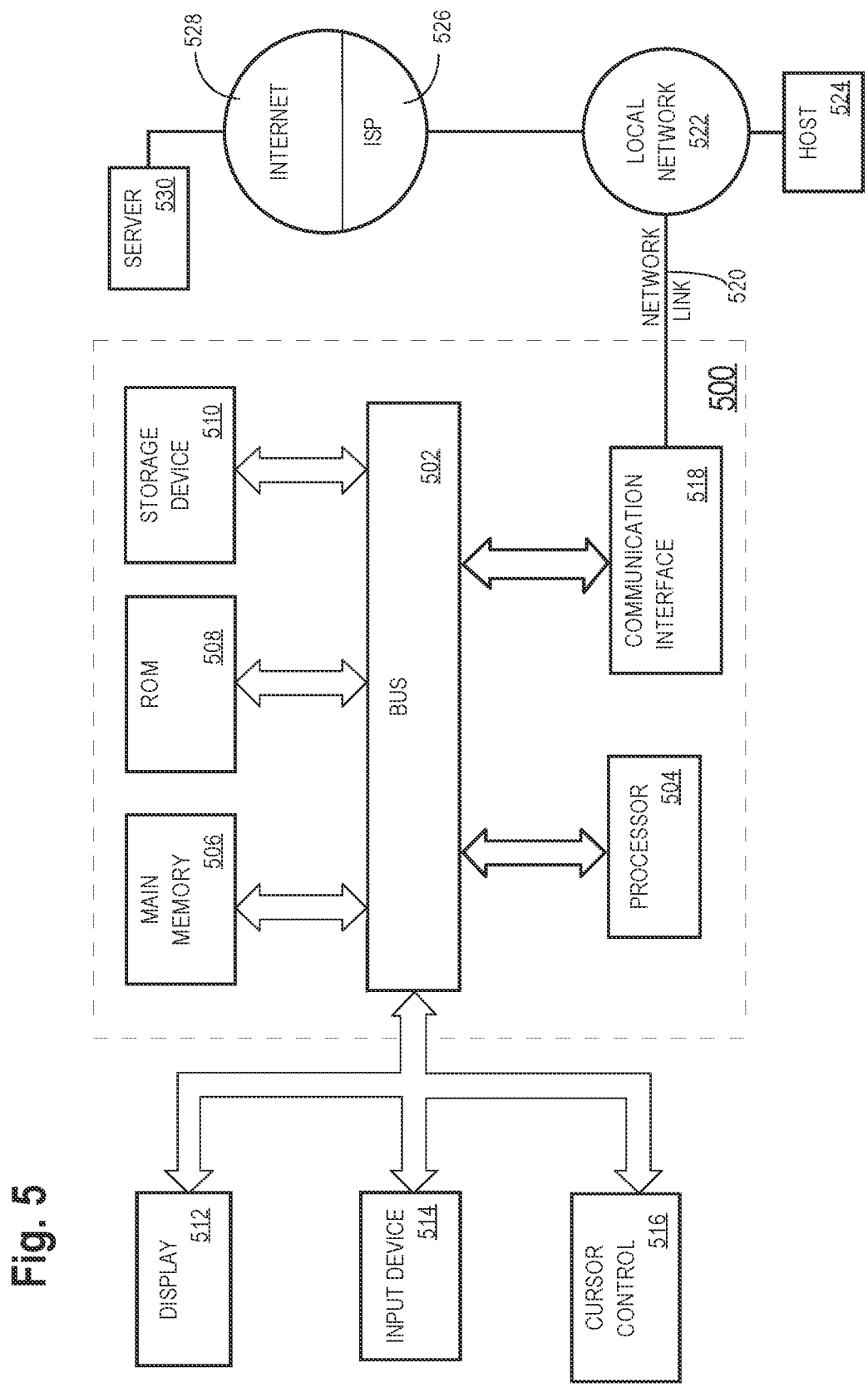
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    receiving, by a database management system, a request to insert a set of records into a segment of a plurality of segments that is stored in persistent storage, wherein each segment of the plurality of segments is a container comprising: (1) one or more extents that contain a plurality of data blocks, and (2) a plurality of references to one or more sub-segments of said each segment, wherein each sub-segment of the one or more sub-segments are containers that contain one or more other extents;
    upon receiving the request to insert the set of records, selecting a particular sub-segment of the one or more sub-segments of a particular segment of the plurality of segments to temporarily store the set of records;
    inserting the set of records into a particular plurality of data blocks belonging to particular one or more other extents of the particular sub-segment;
    monitoring access frequency for the set of records stored in the particular plurality of data blocks to determine whether the access frequency is less than a first threshold;
    designating, in response to determining that the access frequency for at least a subset of the set of records stored in the particular plurality of data blocks is less than the first threshold, the particular sub-segment as having an interim state, wherein the interim state for the particular sub-segment does not allow subsequent inserts of records into the particular sub-segment;
    while said particular sub-segment is in said interim state, accessing said particular sub-segment;
    upon determining that the access frequency while said particular sub-segment is in said interim state for at least a subset of the set of records stored in the particular plurality of data blocks is less than the first threshold, performing compression on the at least a subset of the set of records stored in the particular plurality of data blocks to generate a set of compressed data; and
    inserting the set of compressed data into a particular extent of the one or more extents of the particular segment of the plurality of segments;
    wherein the method is performed by one or more computing devices.

2. The computer-implemented method of claim 1, further comprising:
    upon inserting the set of compressed data into the particular extent, deleting the at least a subset of the set of records stored in the particular plurality of data blocks;
    determining that the particular sub-segment does not contain the set of records in the particular plurality of data blocks; and
    deleting the particular sub-segment.

3. The computer-implemented method of claim 1, wherein the compression comprises a first compression;
    monitoring access frequency for a second subset of the set of records stored in the plurality of data blocks to determine whether the access frequency is less than the first threshold; and
    upon determining that the access frequency for the second subset of the set of records stored in the particular plurality of data blocks is less than the first threshold: performing a second compression on the second subset of the set of records stored in the particular plurality of data blocks to generate a set of second compressed data; and
    inserting the set of second compressed data into the particular segment.

4. The computer-implemented method of claim 3, wherein the first compression and the second compression are performed using different compression algorithms.

5. The computer-implemented method of claim 1, wherein the compression performed on the at least a subset of the set of records stored in the particular plurality of data blocks is one of: a hybrid columnar compression, an online transaction processing compression, or a row-level compression.

6. The computer-implemented method of claim 1, further comprising:
    monitoring access frequency for the set of compressed data stored in data blocks belonging to the particular extent of the one or more extents of the particular segment to determine whether the access frequency is greater than a second threshold;
    upon determining that the access frequency for at least a subset of the set of compressed data is greater than the second threshold, generating a second sub-segment, wherein the particular segment contains a reference to the second sub-segment, and wherein the second sub-segment is a container that contains one or more second extents;
    performing decompression on the at least a subset of the set of compressed data to generate a second set of records; and
    inserting the second set of records into a second plurality of data blocks belonging to a second extent of the one or more second extents of the second sub-segment.

7. The computer-implemented method of claim 1, further comprising:
    monitoring the access frequency for the set of records stored in the particular plurality of data blocks to determine whether the access frequency is less than a second threshold and greater than or equal to the first threshold;
    upon determining that the access frequency for a second subset of the set of records stored in the particular plurality of data blocks is less than the second threshold and greater than or equal to the first threshold, performing compression on the second subset of the set of records stored in the particular plurality of data blocks to generate a second set of compressed data;
    wherein the set of compressed data and the second set of compressed data have been compressed using different compression algorithms; and inserting the second set of compressed data into a second extent of the one or more extents of the particular segment of the plurality of segments.

8. The computer-implemented method of claim 1, wherein the plurality of references to the one or more sub-segments of the particular segment are stored within a sub-segment metadata block, and a reference to the sub-segment metadata block is stored within a particular segment header of the particular segment.

9. The computer-implemented method of claim 1, wherein the request to insert the set of records is a direct path load request.

10. A non-transitory computer-readable storage medium storing sequences of instructions that, when executed by one or more processors, cause:
receiving, by a database management system, a request to insert a set of records into a segment of a plurality of segments that is stored in persistent storage, wherein each segment of the plurality of segments is a container comprising: (1) one or more extents that contain a plurality of data blocks, and (2) a plurality of references to one or more sub-segments of said each segment, wherein each sub-segment of the one or more sub-segments are containers that contain one or more other extents;
upon receiving the request to insert the set of records, selecting a particular sub-segment of the one or more sub-segments of a particular segment of the plurality of segments to temporarily store the set of records;
inserting the set of records into a particular plurality of data blocks belonging to particular one or more other extents of the particular sub-segment;
monitoring access frequency for the set of records stored in the particular plurality of data blocks to determine whether the access frequency is less than a first threshold;
designating, in response to determining that the access frequency for at least a subset of the set of records stored in the particular plurality of data blocks is less than the first threshold, the particular sub-segment as having an interim state, wherein the interim state for the particular sub-segment does not allow subsequent inserts of records into the particular sub-segment;
while said particular sub-segment is in said interim state, accessing said particular sub-segment,
upon determining that the access frequency while said particular sub-segment is in said interim state for at least a subset of the set of records stored in the particular plurality of data blocks is less than the first threshold, performing compression on the at least a subset of the set of records stored in the particular plurality of data blocks to generate a set of compressed data; and
inserting the set of compressed data into a particular extent of the one or more extents of the particular segment of the plurality of segments.

11. The non-transitory computer-readable storage medium of claim 10, the sequences of instructions including instructions that, when executed by the one or more processors, cause:
upon inserting the set of compressed data into the particular extent, deleting the at least a subset of the set of records stored in the particular plurality of data blocks;
determining that the particular sub-segment does not contain the set of records in the particular plurality of data blocks; and
deleting the particular sub-segment.

12. The non-transitory computer-readable storage medium of claim 7, wherein the compression comprises a first compression, and wherein the sequences of instructions including instructions that, when executed by the one or more processors, cause:
monitoring access frequency for a second subset of the set of records stored in the plurality of data blocks to determine whether the access frequency is less than the first threshold; and
upon determining that the access frequency for the second subset of the set of records stored in the particular plurality of data blocks is less than the first threshold: performing a second compression on the second subset of the set of records stored in the particular plurality of data blocks to generate a set of second compressed data; and
inserting the set of second compressed data into the particular segment.

13. The non-transitory computer-readable storage medium of claim 12, wherein the first compression and the second compression are performed using different compression algorithms.

14. The non-transitory computer-readable storage medium of claim 10, wherein the compression performed on the at least a subset of the set of records stored in the particular plurality of data blocks is one of: a hybrid columnar compression, an online transaction processing compression, or a row-level compression.

15. The non-transitory computer-readable storage medium of claim 10, the sequences of instructions including instructions that, when executed by the one or more processors, cause:
monitoring access frequency for the set of compressed data stored in data blocks belonging to the particular extent of the one or more extents of the particular segment to determine whether the access frequency is greater than a second threshold;
upon determining that the access frequency for at least a subset of the set of compressed data is greater than the second threshold, generating a second sub-segment, wherein the particular segment contains a reference to the second sub-segment, and wherein the second sub-segment is a container that contains one or more second extents;
performing decompression on the at least a subset of the set of compressed data to generate a second set of records; and
inserting the second set of records into a second plurality of data blocks belonging to a second extent of the one or more second extents of the second sub-segment.

16. The non-transitory computer-readable storage medium of claim 10, the sequences of instructions including instructions that, when executed by the one or more processors, cause:
monitoring the access frequency for the set of records stored in the particular plurality of data blocks to determine whether the access frequency is less than a second threshold and greater than or equal to the first threshold;
upon determining that the access frequency for a second subset of the set of records stored in the particular plurality of data blocks is less than the second threshold and greater than or equal to the first threshold, performing compression on the second subset of the set of records stored in the particular plurality of data blocks to generate a second set of compressed data;

wherein the set of compressed data and the second set of compressed data have been compressed using different compression algorithms; and inserting the second set of compressed data into a second extent of the one or more extents of the particular segment of the plurality of segments.

17. The non-transitory computer-readable storage medium of claim 10, wherein the plurality of references to the one or more sub-segments of the particular segment are stored within a sub-segment metadata block, and a reference to the sub-segment metadata block is stored within a particular segment header of the particular segment.

18. The non-transitory computer-readable storage medium of claim 10, wherein the request to insert the set of records is a direct path load request.

* * * * *

UNITED STATES PATENT AND TRADEMARK OFFICE
CERTIFICATE OF CORRECTION

PATENT NO. : 12,287,784 B2
APPLICATION NO. : 18/138242
DATED : April 29, 2025
INVENTOR(S) : Lee et al.

Page 1 of 1

It is certified that error appears in the above-identified patent and that said Letters Patent is hereby corrected as shown below:

In the Specification

In Column 12, Line 6, delete "MondoDB™" and insert -- MongoDB™ --, therefor.

In the Claims

In Column 19, Line 45, in Claim 10, delete "sub-segment," and insert -- sub-segment; --, therefor.

In Column 20, Line 2, in Claim 12, delete "claim 7," and insert -- claim 10, --, therefor.

Signed and Sealed this
Twenty-second Day of July, 2025

Coke Morgan Stewart
*Acting Director of the United States Patent and Trademark Office*